(12) United States Patent
Rong (10) Patent No.: US 10,688,702 B1
(45) Date of Patent: Jun. 23, 2020

(54) OPTICAL ASSEMBLY FABRICATED WITH LIQUID OPTICAL MATERIAL

(71) Applicant: Facebook Technologies, LLC, Menlo Park, CA (US)

(72) Inventor: Wei Rong, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 188 days.

(21) Appl. No.: 15/976,871

(22) Filed: May 11, 2018

(51) Int. Cl.
| | |
|---|---|
| G02B 5/30 | (2006.01) |
| B29C 45/58 | (2006.01) |
| G02B 27/01 | (2006.01) |
| G02B 13/00 | (2006.01) |
| G02B 1/04 | (2006.01) |

(52) U.S. Cl.
CPC .............. B29C 45/58 (2013.01); G02B 1/041 (2013.01); G02B 13/0055 (2013.01); G02B 27/0101 (2013.01)

(58) Field of Classification Search
CPC . G02B 1/00; G02B 1/04; G02B 10/41; G02B 1/08; G02B 5/30; G02B 5/3025; G02B 27/28; G02B 27/283; G02B 27/286; B29C 35/00; B29C 35/02; B29C 35/0288; B29C 39/00; B29C 39/003; B29C 39/02; B29C 39/04; B29C 39/10; B29C 39/12; B29C 39/123; B29C 41/003; B29C 41/02
USPC .............. 359/483.01, 489.01, 49.07, 489.08, 359/489.09, 489.11, 489.14, 489.15, 359/489.16, 489.2; 264/1.1, 1.31, 1.32, 264/1.34, 1.7, 1.9, 478, 494, 496; 362/19; 353/20
See application file for complete search history.

(56) References Cited

U.S. PATENT DOCUMENTS

| | | | | |
|---|---|---|---|---|
| 4,840,754 | A * | 6/1989 | Morgan | ................... B29C 39/02 264/2.2 |
| 6,217,806 | B1 * | 4/2001 | Baxley | ................... B29C 39/021 264/161 |
| 6,843,951 | B2 * | 1/2005 | Vogel | ..................... A61C 13/14 249/54 |
| 10,139,522 | B2 * | 11/2018 | Marullo | ........... B29D 11/00067 |
| 2012/0037951 | A1 * | 2/2012 | Terada | ................... B29C 39/006 257/100 |
| 2012/0154910 | A1 * | 6/2012 | Yajima | ............. B29D 11/00644 359/487.02 |
| 2018/0231778 | A1 * | 8/2018 | Yoon | ................... G02B 27/0172 |

* cited by examiner

Primary Examiner — Arnel C Lavarias
(74) Attorney, Agent, or Firm — Freestone Intellectual Property Law PLLC; Aaron J. Visbeek (57) ABSTRACT

A method of fabricating an optical assembly includes positioning an optical structure between a first portion of a mold tool and a second portion of the mold tool and providing a transparent liquid optical material into a first cavity of the mold tool and into the second cavity of the mold tool while the optical structure is positioned between the first portion of the mold tool and the second portion of the mold tool. The first cavity is defined by the first portion of the mold tool and the second cavity is defined by the second portion of the mold tool. The liquid optical material is cured to form the optical assembly.

15 Claims, 8 Drawing Sheets

OPTICAL ASSEMBLY FABRICATED WITH LIQUID OPTICAL MATERIAL

TECHNICAL FIELD

This disclosure relates generally to optics, and in particular to but not exclusively to optical assemblies fabricated with a liquid optical material.

BACKGROUND INFORMATION

High quality optical assemblies that may include a combination of lenses, filters, and/or polarizers are used extensively in both commercial and consumer products. Manufactures endeavor to drive down the cost of optical assembly fabrication while retaining or improving the quality of the optical assemblies. When multiple elements are included in an optical assembly, the fabrication steps and fabrication time is generally increased.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an optical assembly and a process of fabricating an optical assembly including a liquid optical substance are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The example optical assemblies and processes of fabricating optical assemblies that are described in this disclosure utilize a transparent liquid optical material such as optical silicone to form an optical assembly. An optical structure including filters, lenses, and/or polarizers may be secured between cavities of a mold tool. Subsequently, the transparent liquid optical material may be provided (poured or injected) into the cavities while the optical structure is secured between the cavities of the mold tool. In some embodiments, the transparent liquid optical material is cured to a flexible or semi-flexible state. Tabs of the optical structure that assisted in securing/positioning the optical structure in the mold may be trimmed away. Utilizing a liquid optical substance may reduce the number of steps use to fabricate and align optical assemblies. Additionally, the liquid optical substance may allow for a low-temperature fabrication process that increases manufacturing yields. The optical assembly may be included in a head mounted display (HMD) to direct light from a display of the HMD to an eyebox area for a user to view the display light. The optical assembly may also be used in other contexts. These and other embodiments are described in detail below with respect to FIGS. 1-5.

Figure 1:
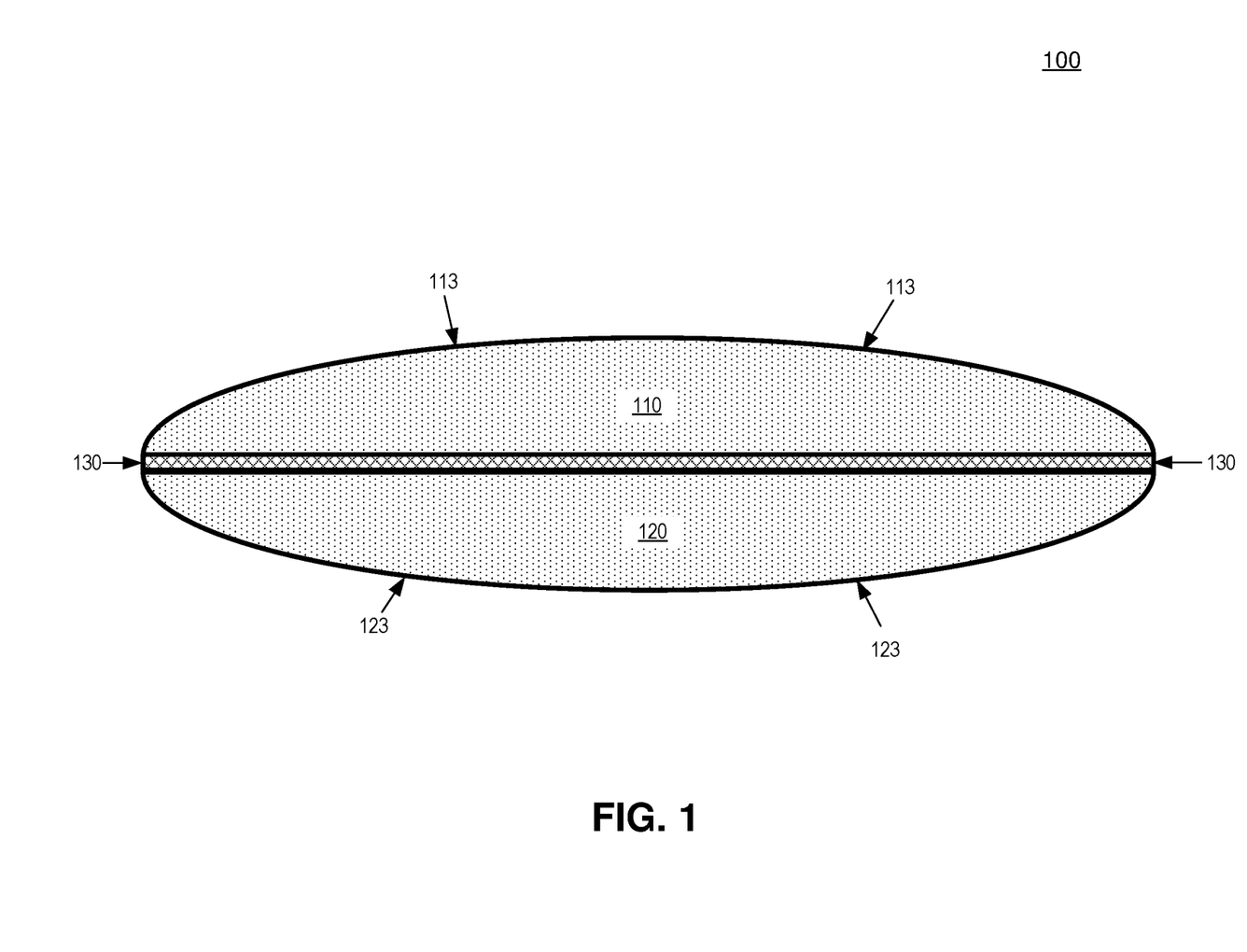
FIG. 1 illustrates a side view of an example optical assembly including an optical structure disposed between a first refractive element and a second refractive element formed from a liquid optical material, in accordance with an embodiment of the disclosure.

FIG. 1 illustrates a side view of an example optical assembly 100 including an optical structure 130 disposed between a first refractive element 110 and a second refractive element 120 formed from a liquid optical material, in accordance with an embodiment of the disclosure. In FIG. 1, first refractive element 110 and second refractive element 120 may be formed of a transparent liquid optical material (e.g. optical silicone or polyurethane) that has been cured. Although a resin including polyurethane may have a lower viscosity than optical silicone, both are still liquids for purposes of this disclosure. After curing, first refractive element 110 and second refractive element 120 may have a flexible or semi-flexible state. In some embodiments, first refractive element 110 and second refractive element 120 may be fully hardened after curing.

In FIG. 1, first refractive element 110 has a first lensing curvature 113 and second refractive element 120 has a second lensing curvature 123. In the illustrated embodiment, first lensing curvature 113 and second lensing curvature 123 are convex. In other embodiments, first lensing curvature 113 and/or second lensing curvature 123 may be concave.

Optical structure 130 is disposed between first refractive element 110 and second refractive element 120. The optical structure 130 may be rigid or flexible. Optical structure 130 may include various filters, polarizers, apertures, reflectors, and/or lenses. The lenses may provide optical power using traditional refractive lenses, diffractive lenses, and/or Fresnel lenses, for example. Optical structure 130 is not necessarily to scale in FIG. 1 and implementations of optical assembly 100 may include an optical structure 130 that is much thinner or much thicker than illustrated.

Figure 2A:
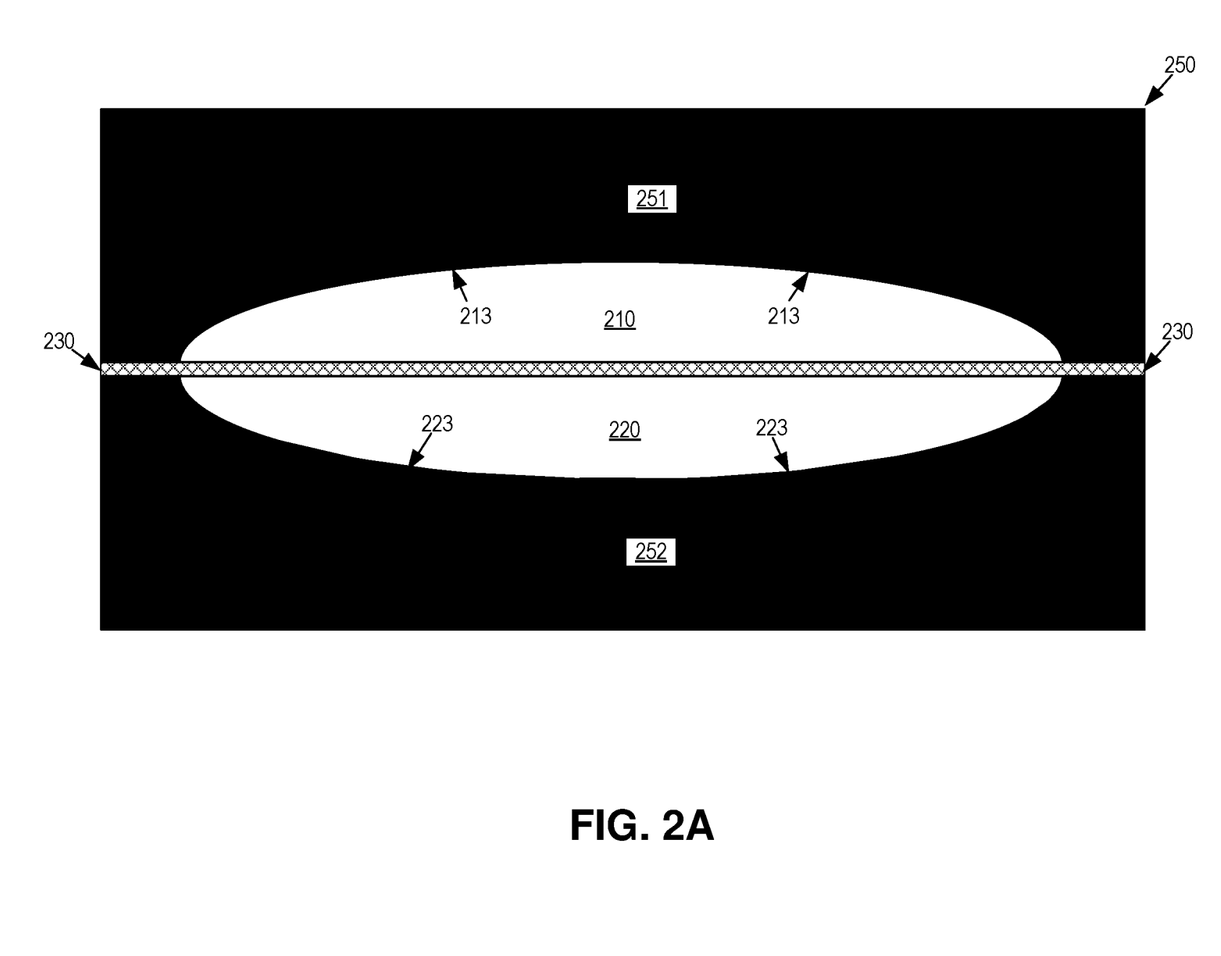
FIGS. 2A-2D illustrates an example process of fabricating an optical assembly with a liquid optical material, in accordance with an embodiment of the disclosure.

FIGS. 2A-2D illustrates an example process of fabricating an optical assembly with a liquid optical material, in accordance with an embodiment of the disclosure. FIG. 2A includes a mold tool 250 that includes a first cavity 210 defined by a first portion 251 of the mold tool 250. Mold tool 250 also includes a second cavity 220 defined by a second portion 252 of the mold tool 250. The first cavity 210 of the mold tool 250 is configured to impart a first lensing curvature 213 to a first refractive element of a resulting optical assembly and the second cavity 220 of the mold tool 250 is configured to impart a second lensing curvature 223 to a second refractive element of the resulting optical assembly. The first lensing curvature 213 and the second lensing curvature 223 may be spherical or aspherical.

In FIG. 2A, optical structure 230 is positioned between first cavity 210 and second cavity 220. Optical structure 230 may be secured into place by clamping tabs at the ends of optical structure 230 between first portion 251 and second portion 252. In one embodiment (not illustrated) mold tool 250 includes posts that are keyed to holes in tabs of optical structure 230 so that optical structure 230 can be easily aligned and positioned to mold tool 250. In an embodiment, external clamps hold optical structure 230 in place during the molding process.

Figure 2B:
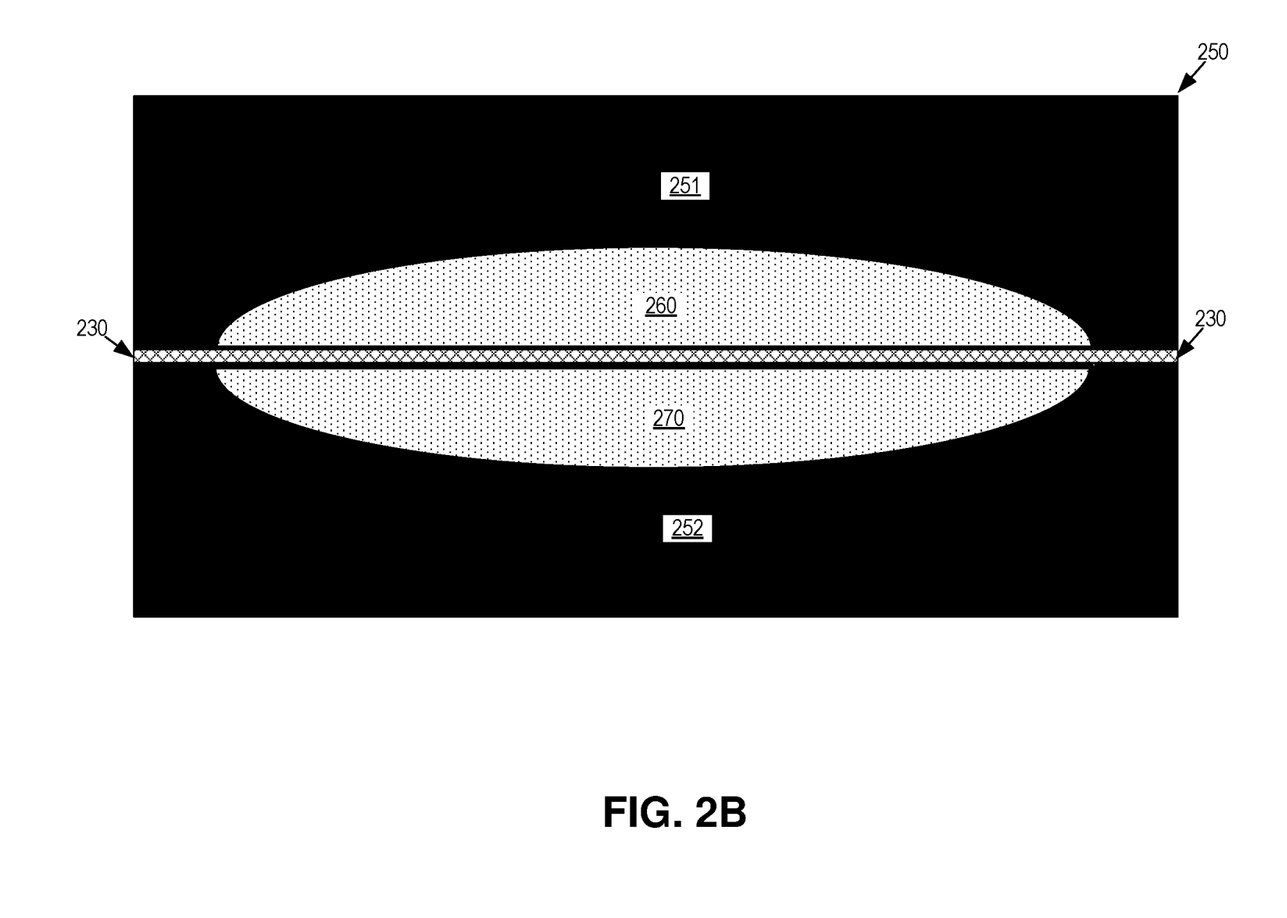

In FIG. 2B, a transparent liquid optical material has been provided (e.g. poured or injected) into cavities 210 and 220 and subsequently cured to form a first refractive optical element 260 and a second refractive optical element 270. After the transparent liquid optical material is provided to the cavites, the transparent liquid optical material is allowed to cure. In one embodiment, curing the transparent liquid optical material includes heating the transparent liquid optical material. In one embodiment, curing the transparent liquid optical material includes exposing the transparent liquid optical material to a curing light source (e.g. ultraviolet or infrared). The first refractive element 260 is defined by the transparent liquid optical material curing in the first cavity 210 of the mold tool 250 and the second refractive element 270 is defined by transparent liquid optical material curing in the second cavity 220 of the mold tool 250.

When optical silicone is used as the transparent liquid optical material for the process illustrated in FIGS. 2A-2D, the optical silicone may be heated to a relatively low temperature (e.g. 150° C. or below) for curing. In one embodiment, the optical silicone is cured at a temperature less than 85° C. In one embodiment, the material formulation of moldable optical silicon is modified to shorten the curing time at low temperatures. For example, the amount of inhibitor in the material formulation is reduced to support a faster curing time at low temperature. In conventional techniques for fabricating optical assemblies, higher temperatures are typically required for process steps such as bonding different optical structures together. The disclosed technique, in contrast, may accomplish (1) creating two refractive optical elements (e.g. 260/270); (2) bonding both refractive optical elements to optical structure 230 in one step (curing); and (3) performing the creation of refractive optical elements and their bonding at low temperature. Thus, the amount of process steps may be reduced from conventional fabrication techniques. Furthermore, the temperature required to cure optical silicone may be substantially lower than temperatures required for bonding a refractive optical element to an optical structure 230. And, preventing the optical structure 230 (which may include filters or polarizers) from being exposed to higher temperatures may preserve the integrity of the optical structure 230 and thus increase manufacturing yields of optical assembly 299 since many optical structures are temperature sensitive.

Figure 2C:
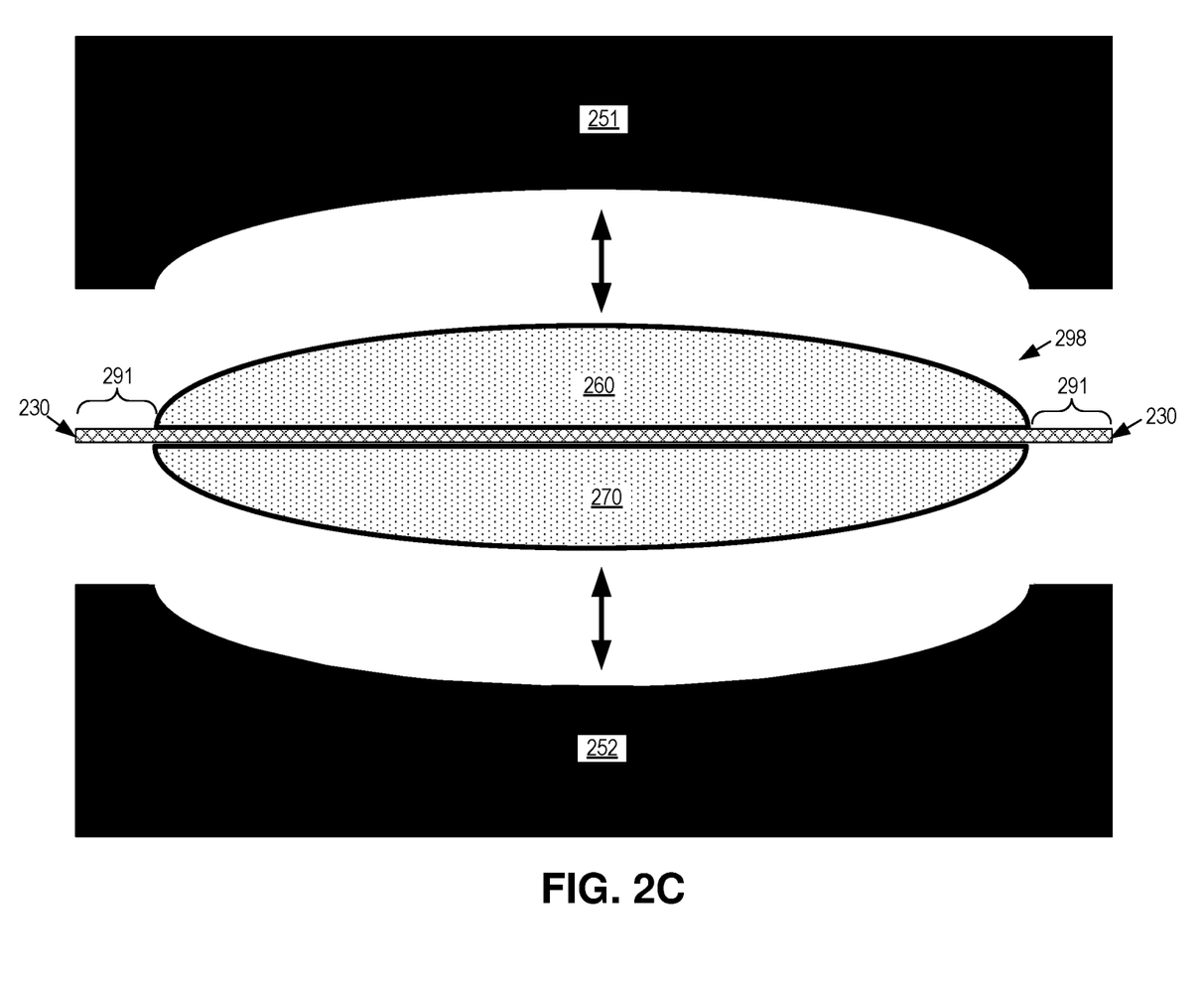

Referring now to FIG. 2C, the first portion 251 and second portion 252 of the mold tool 250 are removed. In FIG. 2C, optical structure 298 includes optical structure 230 disposed between first refractive element 260 and second refractive optical element 270. Optical structure 230 may isolate first refractive element 260 from second refractive optical element 270 such that element 260 has no contact with element 270. In the illustrated embodiment, first refractive element 260 contacts optical structure 230 and second refractive optical element 270 also contacts optical structure 230 because no intermediate bonding material is used between them. Rather, the curing of the transparent liquid optical material bonds element 260 to structure 230 and bonds element 270 to structure 230. Tabs 291 of optical structure 230 extend beyond the refractive elements 260/270, in the embodiment illustrated in FIG. 2C.

Figure 2D:
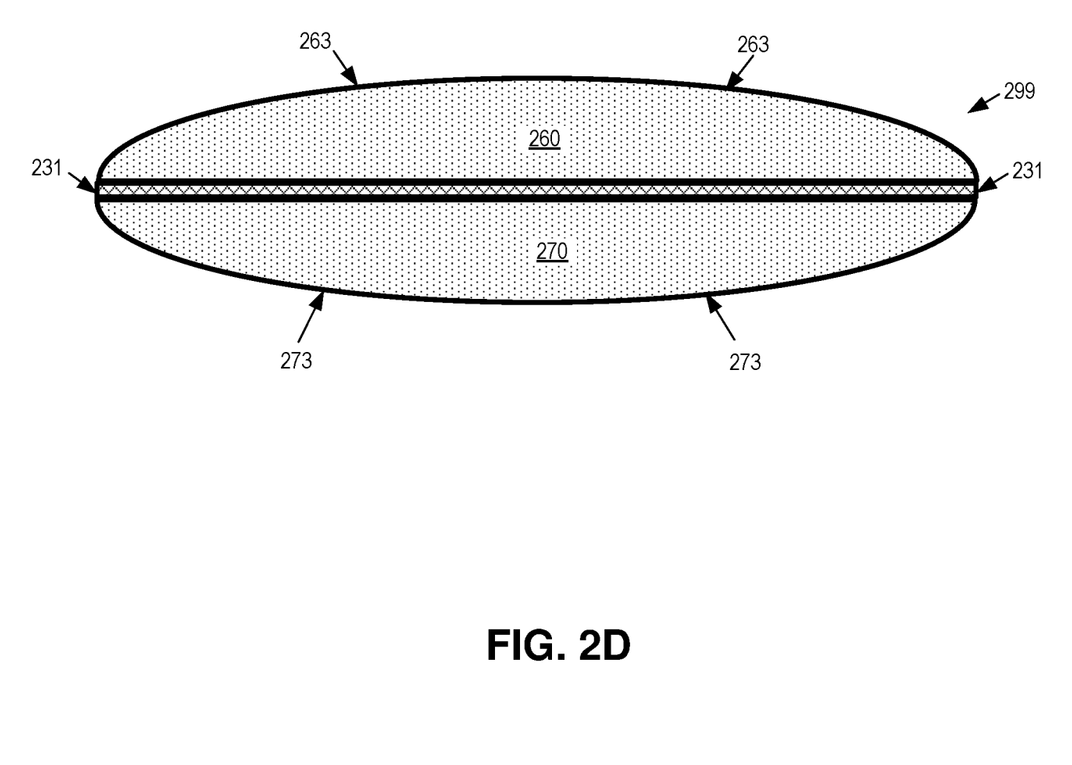

In FIG. 2D, the tabs 291 have been trimmed from optical structure 298 to generate a modified optical assembly 299. Optical assembly 299 includes a refractive optical element 260 having a lensing curvature 263 imparted to the refractive optical element 260 by cavity 210 and also includes a refractive optical element 270 having a lensing curvature 273 imparted to the refractive optical element 270 by cavity 220.

Figure 3:
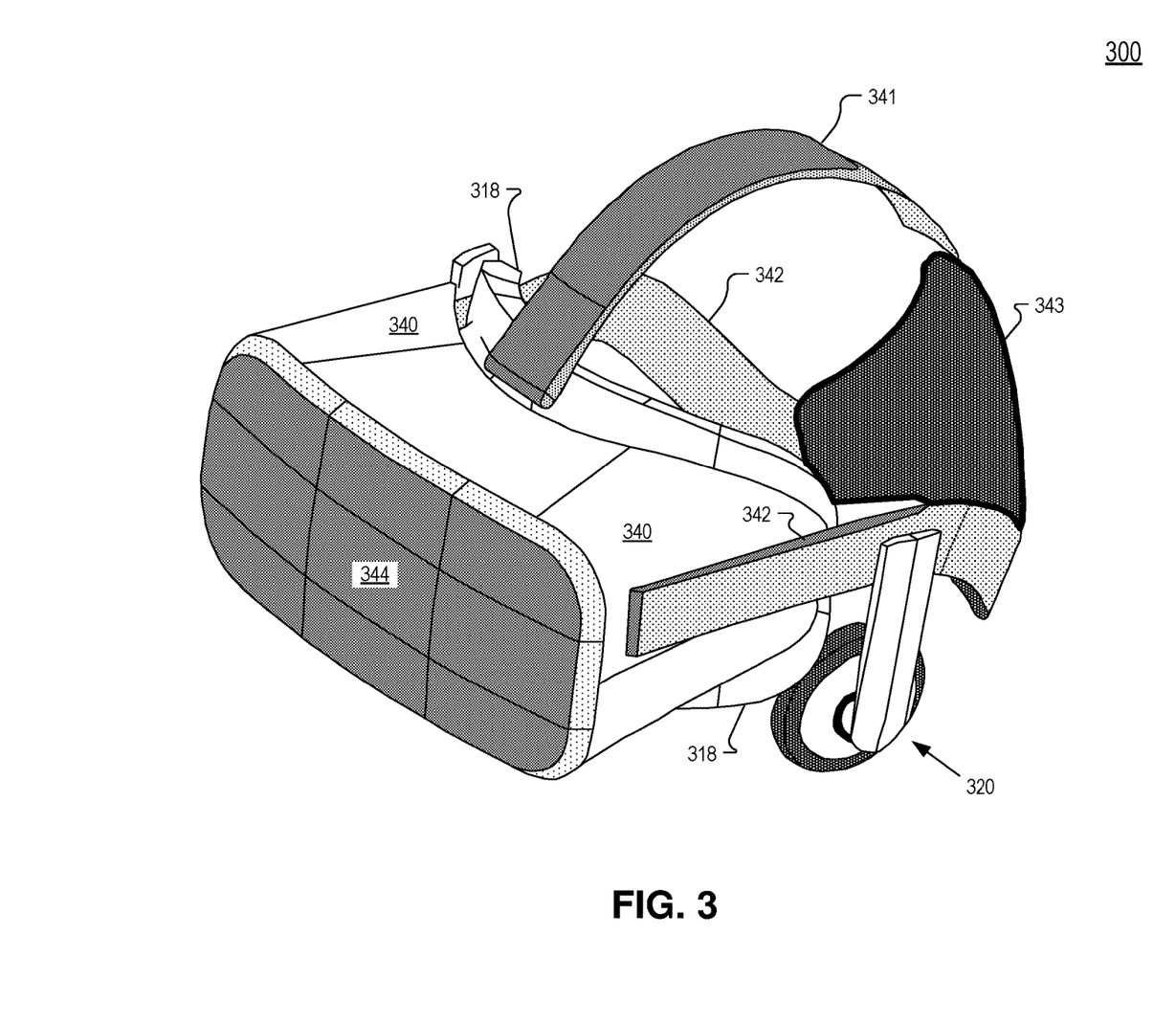
FIG. 3 illustrates an example head mounted display (HMD) that includes an optical assembly, in accordance with an embodiment of the disclosure.

FIG. 3 illustrates an example head mounted display (HMD) 300 that may include an optical assembly such as optical assembly 299, in accordance with an embodiment of the disclosure. HMD 300 is only one illustrative context that may utilize the optical assemblies and techniques for fabricating optical assemblies disclosed herein. Example head mounted display (HMD) 300 includes a top structure 341, a rear securing structure 343, and a side structure 342 attached with a viewing structure 340 having a front rigid body 344. The illustrated HMD 300 is configured to be worn on a head of a user of the HMD. In one embodiment, top structure 341 includes a fabric strap that may include elastic. Side structure 342 and rear securing structure 343 may include a fabric as well as rigid structures (e.g. plastics) for securing the HMD to the head of the user. HMD 300 may optionally include earpiece(s) 320 configured to deliver audio to the ear(s) of a wearer of HMD 300.

In the illustrated embodiment, viewing structure 340 includes an interface membrane 318 for contacting a face of a wearer of HMD 300. Interface membrane 318 may function to block out some or all ambient light from reaching the eyes of the wearer of HMD 300.

Example HMD 300 also includes a chassis for supporting hardware of the viewing structure 340 of HMD 300. Hardware of viewing structure 340 may include any of processing logic, wired and/or wireless data interface for sending and receiving data, graphic processors, and one or more memories for storing data and computer-executable instructions. In one embodiment, viewing structure 340 may be configured to receive wired power. In one embodiment, viewing structure 340 is configured to be powered by one or more batteries. In one embodiment, viewing structure 340 may be configured to receive wired data including video data. In one embodiment, viewing structure 340 is configured to receive wireless data including video data.

Viewing structure 340 may include a display for directing image light to a wearer of HMD 300. The display may include an LCD, an organic light emitting diode (OLED) display, micro-LED display, quantum dot display, picoprojector, or liquid crystal on silicon (LCOS) display for directing image light to a wearer of HMD 300.

Figure 4:
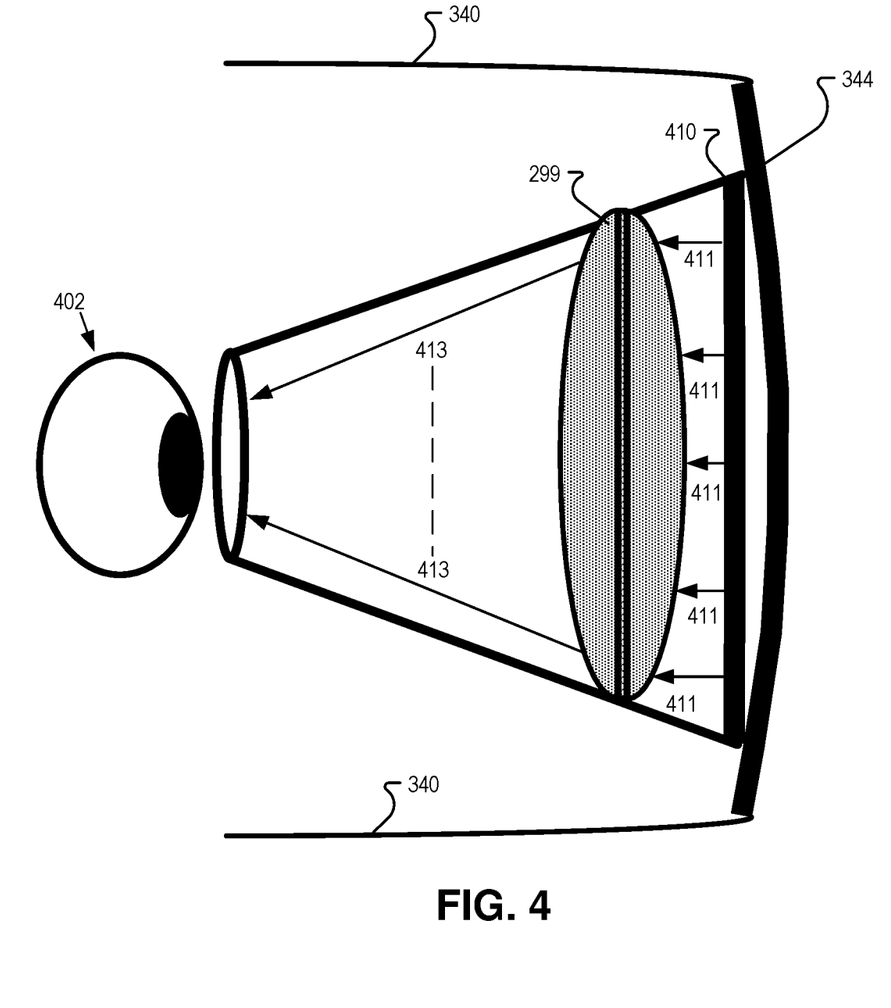
FIG. 4 illustrates a top view of a HMD that includes a display and an optical assembly configured to direct display light to an eyebox area, in accordance with an embodiment of the disclosure.

FIG. 4 illustrates a top view of an HMD that includes a display 410 and an optical assembly 299 configured to direct display light 411 to an eyebox area, in accordance with an embodiment of the disclosure. In FIG. 4, display 410 is illustrated as a flat display emitting display light 411, although in some embodiments display 410 may be a cylindrical display emitting display light 411. Optical assembly 299 is positioned to receive the display light 411 and direct the display light 411 to eye 402 as image light 413. Optical assembly 299 may be configured to allow eye 402 of a wearer of HMD 300 to focus on a virtual image displayed by display 410. Although FIG. 4 only illustrates one eye 402, an HMD may have a display 410 and an optical assembly 299 for each eye of the user of the HMD.

Figure 5:
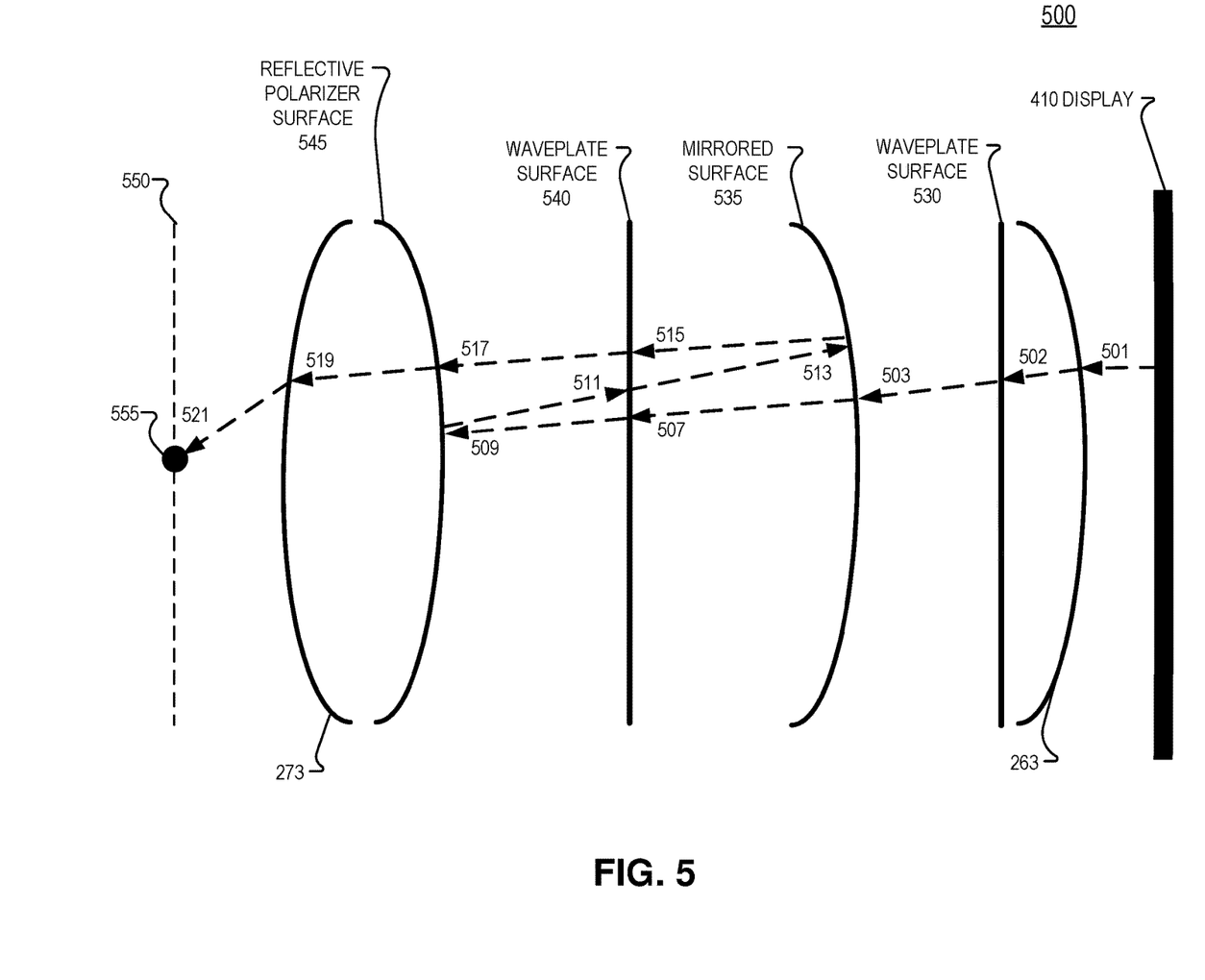
FIG. 5 illustrates an example optical path from a display through an optical assembly, in accordance with an embodiment of the disclosure.

FIG. 5 illustrates an example optical path from a display 410 through an example optical assembly 500, in accordance with an embodiment of the disclosure. Example optical assembly 500 includes display 410, waveplate surface 530, mirrored surface 535, waveplate 540, and reflective polarizer surface 545. Mirrored surface 535 and reflective polarizer surface 545 are illustrated as curves to indicate included optical power. In one embodiment, the mirrored surface 535 and/or reflective polarizer surface 545 are disposed on a lensing curvature to provide optical power. In one embodiment, mirrored surface 535 and/or reflective polarizer surface 545 are disposed on a Fresnel surface to provide optical power.

In operation, display 410 emits a linearly polarized display light 501 that encounters lensing curvature 263 of refractive optical element 260 and exits element 260 as light 502. In some embodiments, display 410 includes one or more linear polarizers that linearly polarized display light emitted from the display 410. Display 410 may be curved in some embodiments. In this disclosure, display light 501 will be assigned a p-polarization orientation for purposes of discussion, although display light 501 may also have a s-polarization orientation. Light 502 is received by waveplate surface 530.

Waveplate surface 530 is configured as a quarter-waveplate that shifts a polarization of display light 501 45 degrees ($\pi/4$) such that the linearly polarized display light 501 in the p-polarization orientation is converted into circularly polarized light 503 after propagating through waveplate surface 530.

Light 503 encounters mirrored surface 535. Mirrored surface 535 is configured as a partially reflective (e.g. 50% reflective) mirror. A portion of light 503 is transmitted by mirrored surface 535 as light 507. The remaining portion of light 503 (not illustrated) that is not transmitted through mirrored surface 535 is reflected by mirrored surface 535.

Light 507 encounters waveplate surface 540 which is configured as a quarter-waveplate that shifts a polarization of light 507 45 degrees ($\pi/4$) such that the circularly polarized light 507 is converted into linearly polarized light 509 in the s-polarization orientation after propagating through waveplate surface 540.

Reflective polarizer surface 545 is configured to reflect light of one polarization and pass (transmit) light of a second polarization. Where display light 501 is p-polarized, reflective polarizer surface 545 is configured to reflect s-polarized light and pass (transmit) p-polarized light. Consequently, s-polarized light 509 is reflected by reflective polarizer surface 545 as light 511.

Light 511 is shifted 45 degrees by waveplate surface 540 and propagates toward mirrored surface 535 as circularly polarized light 513. A portion (e.g. 50%) of light 513 is reflected by mirrored surface 535 as light 515. The handedness of light 515 is opposite of light 513 and 507 due to its reflection off of mirrored surface 535.

Circularly polarized light 515 is shifted 45 degrees once again by waveplate surface 540 and is converted to p-polarized light 517. Since reflective polarizer surface 545 passes p-polarized light in the illustrative example, p-polarized light 517 is passed by reflective polarizer surface 545 as light 519. Light 519 encounters lensing curvature 273 or refractive optical element 270 and exits toward exit pupil 550 as light 521. Point 555 in FIG. 5 illustrates a center of curvature for example optical assembly 500.

The disclosed optical assembly and techniques for fabricating optical assemblies may be utilized to incorporate portions of optical assembly 500. In one embodiment, components 530, 535, 540, and 545 are included in optical structure 230, for example.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of fabricating an optical assembly, the method comprising:
   positioning an optical structure between a first portion of a mold tool and a second portion of the mold tool;
   providing a transparent liquid optical material into a first cavity of the mold tool and into a second cavity of the mold tool while the optical structure is positioned between the first portion of the mold tool and the second portion of the mold tool, wherein the first cavity is defined by the first portion of the mold tool and the second cavity is defined by the second portion of the mold tool; and
   curing the transparent liquid optical material to form the optical assembly.

2. The method of claim 1 further comprising:
   trimming tabs of the optical assembly to generate a modified optical assembly, wherein the tabs of the optical structure are configured to secure the optical structure between the first portion of the mold tool and the second portion of the mold tool during the curing of the transparent liquid optical material, and wherein the tabs extend beyond the first cavity and the second cavity of the mold tool.

3. The method of claim 1, wherein the transparent liquid optical material includes at least one of optical silicone or polyurethane.

4. The method of claim 1, wherein curing the transparent liquid optical material includes heating the transparent liquid optical material to a temperature not exceeding 85 degrees Celsius.

5. The method of claim 1, wherein the optical assembly formed after the curing includes the optical structure disposed between a first refractive element and a second refractive element, the first refractive element defined by the transparent liquid optical material curing in the first cavity of the mold tool and the second refractive element defined by transparent liquid optical material curing in the second cavity of the mold tool.

6. The method of claim 1, wherein the first cavity of the mold tool is configured to impart a first lensing curvature to the optical assembly, and wherein the second cavity of the mold tool is configured to impart a second lensing curvature to the optical assembly.

7. The method of claim 6, wherein at least one of the first lensing curvature and the second lensing curvature is spherical.

8. The method of claim 6, wherein at least one of the first lensing curvature and the second lensing curvature is convex.

9. The method of claim 1, wherein curing the transparent liquid optical material includes exposing the transparent liquid optical material to a curing light source.

10. The method of claim 1, wherein the optical structure includes:
    a first waveplate;
    a second waveplate;
    a mirrored surface disposed between the first waveplate and the second waveplate; and
    a reflective polarizer surface, wherein the second waveplate is disposed between the mirrored surface and the reflective polarizer surface.

11. The method of claim 10, wherein the first waveplate and the second waveplate are quarter-waveplates.

12. The method of claim 1 further comprising:
    removing the optical assembly from the mold tool.

13. The method of claim 1, wherein the optical structure is rigid.

14. An optical assembly fabricated by a process comprising:
    positioning an optical structure between a first portion of a mold tool and a second portion of the mold tool;
    providing a transparent liquid optical material into a first cavity of the mold tool and into a second cavity of the mold tool while the optical structure is positioned between the first portion of the mold tool and the second portion of the mold tool, wherein the first cavity is defined by the first portion of the mold tool and the second cavity is defined by the second portion of the mold tool; and
    curing the transparent liquid optical material to form the optical assembly, wherein the optical assembly includes the optical structure disposed between a first refractive element and a second refractive element, the first refractive element defined by the transparent liquid optical material curing in the first cavity of the mold tool and the second refractive element defined by transparent liquid optical material curing in the second cavity of the mold tool.

15. The optical assembly fabricated by the process of claim 14, wherein the transparent liquid optical material includes optical silicone, and wherein curing the transparent liquid optical material includes heating the transparent liquid optical material to a temperature not exceeding 85 degrees Celsius.

* * * * *